United States Patent [19]
Gabriel

[11] Patent Number: 5,713,538
[45] Date of Patent: Feb. 3, 1998

[54] AUTOMATICALLY-ACTUATED CARGO AND PERSONNEL SCOOPING APPARATUS WITH PERFORATED CUSHIONS AND A NET TO HOLD AND KEEP PERSON IN PLACE

[76] Inventor: Edwin Z. Gabriel, 91 Mt. Tabor Way, Ocean Grove, N.J. 07756

[21] Appl. No.: 514,961

[22] Filed: Aug. 14, 1995

[51] Int. Cl.[6] .................................................. B66C 1/38
[52] U.S. Cl. .................................. 244/118.1; 244/137.2; 441/83; 294/118; 294/99.1
[58] Field of Search .......................... 244/118.1, 118.5, 244/137.1, 137.2, 137.4; 441/87, 80, 83; 294/118, 99.1, 902; 5/81.1 R, 83.1, 638

[56] References Cited

U.S. PATENT DOCUMENTS

| | | | |
|---|---|---|---|
| 1,042,327 | 10/1912 | Costanzo | 441/87 |
| 3,294,346 | 12/1966 | Summers | 244/121 |
| 4,807,421 | 2/1989 | Araki et al. | 294/99.1 |
| 5,039,162 | 8/1991 | Yoshida | 244/141 |
| 5,104,169 | 4/1992 | Kapuski | 5/81.1 R |
| 5,209,538 | 5/1993 | Gabriel | 294/118 |

*Primary Examiner*—Galen L. Barefoot

[57] ABSTRACT

This apparatus is a tongs-like device for remotely scooping up cargo and personnel, comprising two identical elongated members pivoted at a selected distance from the device's top with a pivot pin. The lower portions are curved and vertical with cushions attached to their inner surfaces to enable the apparatus to hold either cargo or a person securely in place.

Each inner lower surface has an inflatable pillow with a perforated spongy cushion attached to it and removable for replacement. The cushions' perforations enable a snatched person to breathe easily, thus avoiding any possibility of suffocation, while being hoisted upwards by hoist equipment. A sturdy net is fastened to the shoulders of the lower portions and draped for the person to sit on. In another technique a pliable plastic sheet, having pie-shaped triangular cuts, allows a person to pass through in one direction but not in the reverse direction.

19 Claims, 13 Drawing Sheets

AUTOMATICALLY-ACTUATED CARGO AND PERSONNEL SCOOPING APPARATUS WITH PERFORATED CUSHIONS AND A NET TO HOLD AND KEEP PERSON IN PLACE

BACKGROUND OF THE INVENTION

This invention is in the field of material handling utilizing helicopters to accelerate the process. A previous U.S. Pat. No. 5,209,538, dated May 11, 1993, also describes such a lifting apparatus for automatically loading and unloading either containerized cargo or personnel. Other previous inventions include sensors and display improvements which enable the cargo snatching operation to be more automatic and more certain, thus reducing the pilot's work-load considerably. Additional back-up, load-retention techniques are offered which are inexpensive and lightweight.

Another previous U.S. Pat. No. 4,678,220, dated Jul. 7, 1987, by Gabriel, also describes a similar apparatus for loading and unloading containerized cargo. The other features are lacking in the above patent, but existing in this apparatus.

No such cargo handling apparatus is known to the applicant having the improvements described in this specification.

SUMMARY OF THE INVENTION

This invention includes cushions in the apparatus' lower portions' inside walls which contain perforations or breathing holes. When a person is embraced snugly between cushions, he could find breathing difficult. With the perforations which are interconnected via channels, he could breathe more easily. In addition, air could be supplied through these holes from one or more canisters with a high percentage of oxygen, should the person rescued be in need of additional oxygen, particularly if the air in the vicinity is polluted or toxic. To enable the person to be more securely and more safely held within apparatus' lower portions, a net constructed or composed of strong, water-proof twine, is provided for him to sit upon, while being hoisted upward by hoist cables. In addition, handles are provided on the shoulders of apparatus' lower portions for the person to hang onto. This same apparatus with structural extensions extending inward from the bottoms of apparatus' lower portions can be provided to scoop up cargo of various shapes and sizes. No such cargo or personnel handling apparatus is known to the applicant having the improvements described in this specification.

BRIEF DESCRIPTION OF DRAWINGS

For the purpose of illustration, the following drawings show forms which are presently preferred. It should be understood, however that this invention is not necessarily limited to the precise arrangement, instrumentalities and field of utility as therein demonstrated.

SPECIFICATION

DESCRIPTION OF A PREFERRED EMBODIMENT

Figure 1:
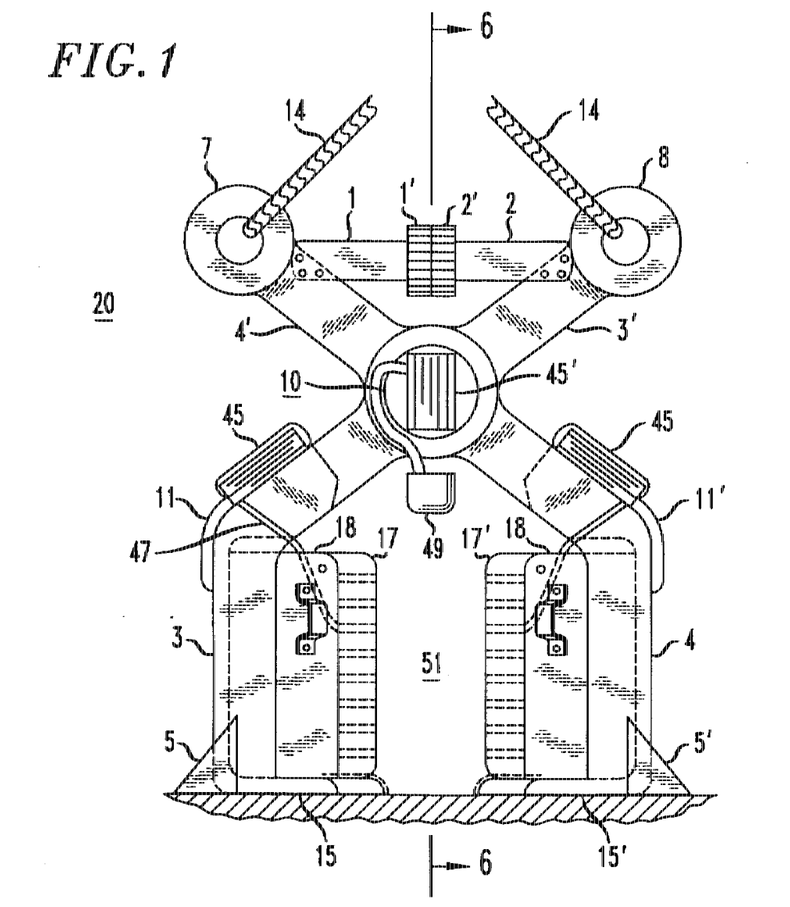
FIG. 1 shows the front view of a tongs-like cargo and personnel lifting apparatus with a containerized load that may be either rectangular or cylindrical in shape. Inflated pillows and attached cushions with perforations adjust to the load's size and shape.
Figure 2:
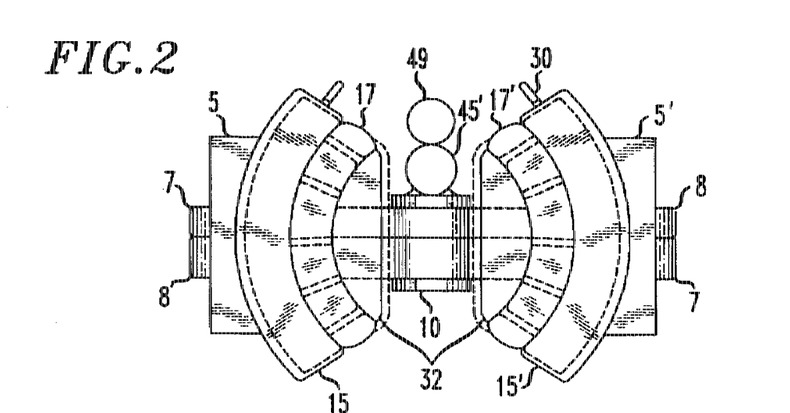
FIG. 2 shows the bottom thereof.

An illustration of an automatically-actuated cargo and personnel snatching apparatus 20 is shown in the assembly drawings of FIGS. 1 and 2. Note that with pivot pin 10 and upper and lower portions 3', 4', 3 and 4, respectively, apparatus 20 resembles forceps in its shape and performance, with some noteworthy deviations, such as much wider lower portions than upper. The apparatus is shown with hoist cables 14, attached to holes in upper portions 3' and 4'.

Other deviations from forceps include the hammerheads 1' and 2', weights 8, inflatable pillows 16, 18 and perforated cushions 17 and 17'.

Lower portion 3 and 4 are circular-shaped with protrusions or extensions 15 and 15' at their bottoms.

The pillows and cushions enable cargo or person embraced to be held securely in place, when scooped up, with very little possibility of the load falling off while being hoisted. A conscious person also has the opportunity of grasping handles 30, while being hoisted.

Sensors, strain-gauges and fingers for extension 15 and 15', would enable the apparatus to remotely and automatically scoop up a person or a containerized load. The inventor's previous U.S. Pat. No. 4,678,220 and No. 5,209,538 describe the apparatus in more detail, and they would be suggested as reference material.

Figures 3, 4:
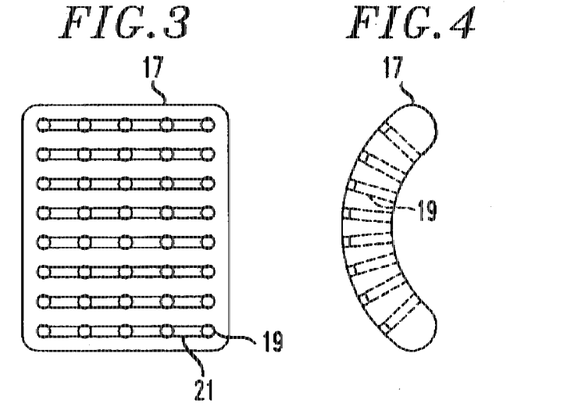
FIG. 3 shows the back view of one curved perforated spongy cushion to allow a snatched person to breathe freely when securely reained within the apparatus' lower portions. Channels behind the cushion interconnect each row of perforations.
FIG. 4 shows the end view of the perforated spongy foam material.
Figure 5:
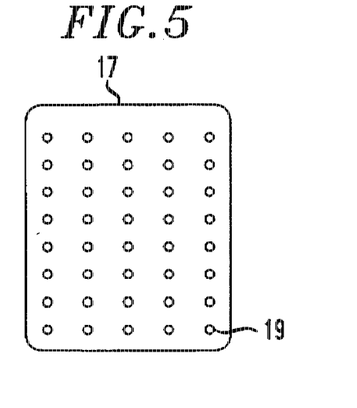
FIG. 5 is a front view thereof showing the perforations.

The improvements over previous patents include foam or sponge-like pillows 17 and 17', FIGS. 1 and 2, with perforations 19, FIG. 3, the back side of the pillow.

The holes or perforations 19 prevent or avoid the person being embraced from suffocating. The holes 19 breathe air. Channels 21 for each of the 8 rows allow air to circulate between the holes. The holes are large enough so they do not clog easily. The person embraced has assurance that he can breathe air while being hoisted as well as being securely held by the spongy durable foam.

Figure 10:
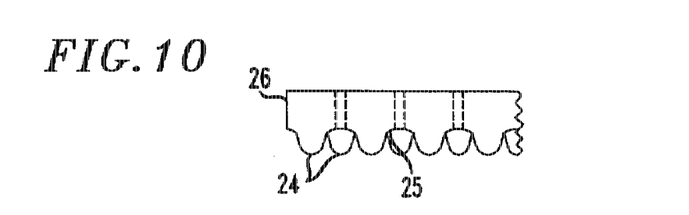
FIG. 10 is an enlarged partial end view of FIG. 9, showing the peaks and troughs of the spongy cushions.

Foam pillows, or cushions 17 and 17' are attached to inflatable pillows 16 and 18, so they can be removed and replaced either by the same identical pillow or by another design of pillow, such as pillow 26, FIG. 10. One way to attach foam pillow 17 to inflatable pillow 16 is to have threaded studs projecting from 16 in line with existing peripheral holes 19 in 17. Nuts in 17 could be screwed onto threaded studs. Both the studs and the nuts could be placed along the borders of both pillows 18 and cushion 17. Cushions 17 and 17' would be identical, FIG. 1.

Figure 7:
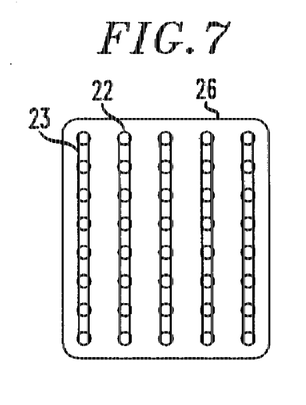
FIG. 7 shows the back side view of one curved perforated foam cushion to allow a snatched person to breathe freely while securely retained within the apparatus' lower portions. Channels behind the cushions interconnect each column of perforations. Peaks and recesses on the cushions' exterior also assist in allowing persons to breathe.
Figure 8:
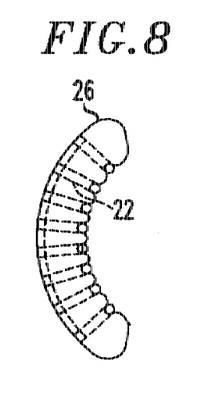
FIG. 8 is an end view thereof.
Figure 9:
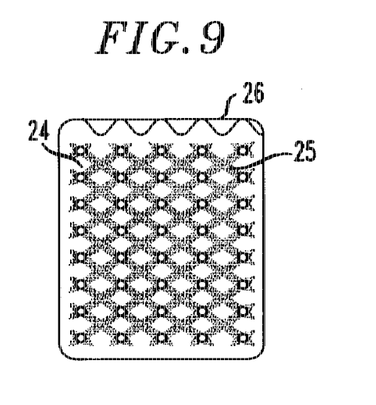
FIG. 9 is a front view thereof showing the perforations, the peaks and the recesses or troughs, to assist an embraced person to breathe freely.

FIGS. 7, 8, 9 represent another design but the same size cushion 26, as cushion 17. In this design, the same number of ventilation holes and interconnecting channels for air circulation exist. However the cushion's inside has peaks 24 and troughs 25 wherein holes 22 are located. Peaks 24 are cone-shaped. The troughs could be the mirror image of cones or inversions of the cones. The cushions could be either water resistant or waterproof.

Figure 6:
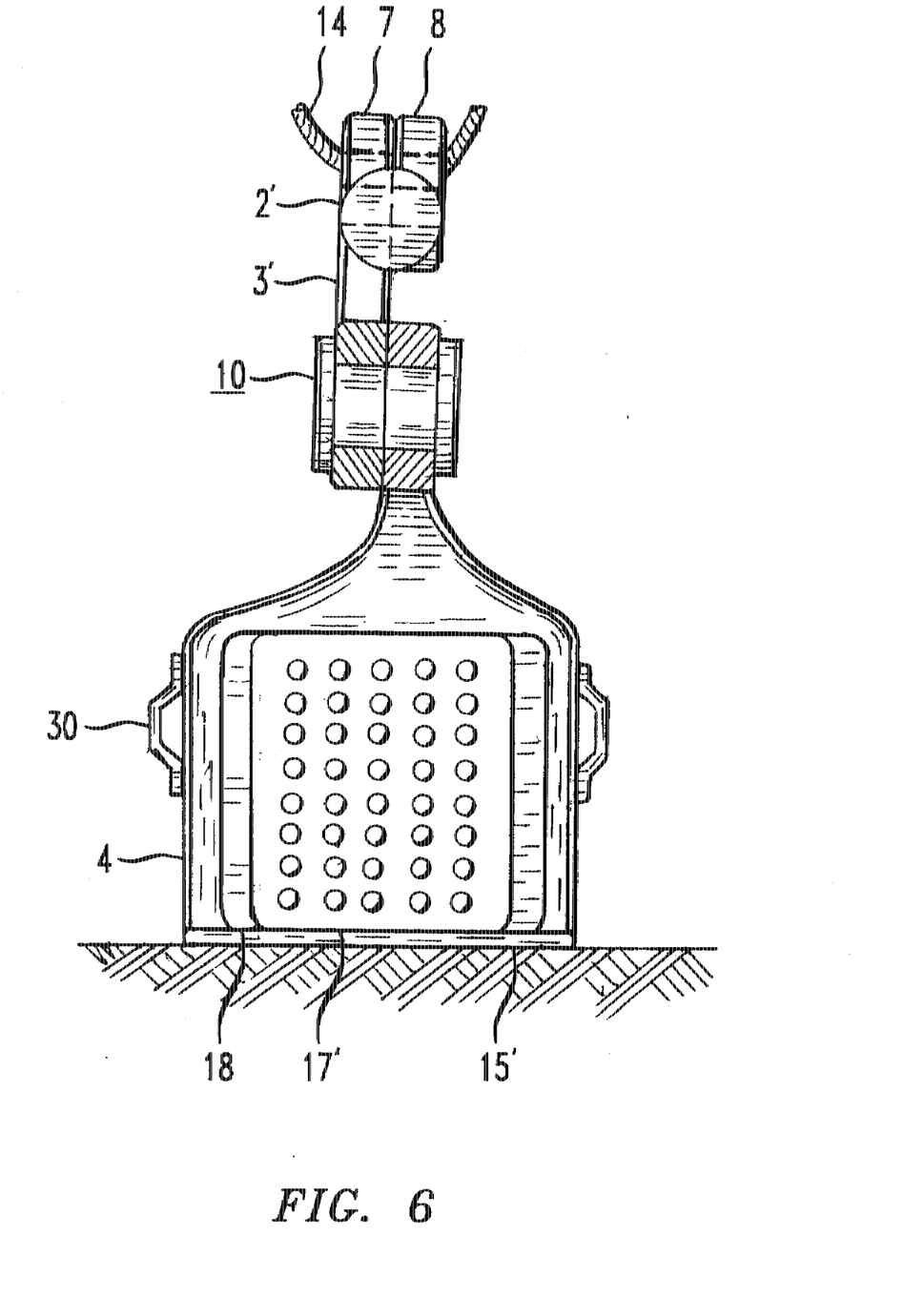
FIG. 6 is a section of apparatus 20 taken along line 6—6.

FIG. 6 is a sectional view taken along line 6—6 of FIG. 1. Inside view of cushion 17' is shown, as well as the exteriors portions of pillow 18 and lower portion 4. Upper portion 3' and sectional views of hubs surrounding pin 10 also are shown. Above pin 10, the front view of hammerhead 2' is shown as a circle. Above hammerhead 2' are cable-attachment ring 7 and weight-ring 8.

FIG. 10 is an enlarged partial end view of FIG. 9 showing peaks and troughs of the sponge cushion.

DESCRIPTION OF ANOTHER PREFERRED EMBODIMENT

Figure 12:
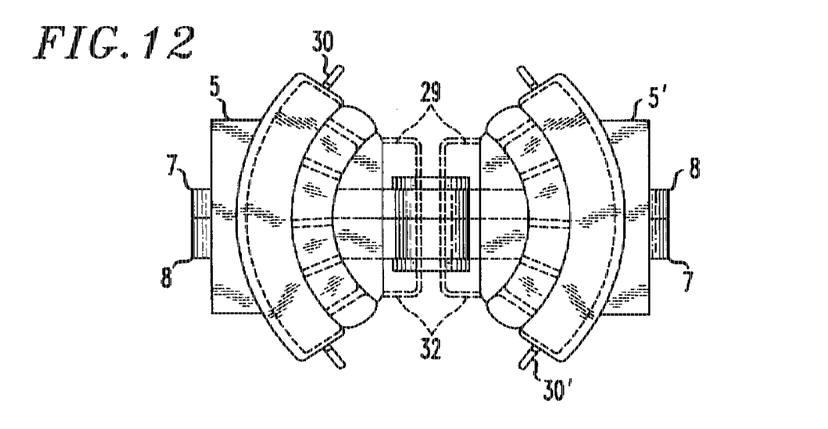
FIG. 12 shows a bottom view thereof.

To this embodiment additional means are provided to enable a person to be securely held in place after being scooped up by apparatus 20', and while being hoisted upward. The person may have to contend with wind gusts and freezing rain. Handles 30 are located in convenient locations in or on apparatus' lower portions to grasp, while in a sitting position, embraced between cushions 17 and 17'. To further assist in retaining the rescued person between the cushions, a non-drying, sticky rubbery substance, such as rubber cement, may be added to the surfaces of cushions 17 and 17'. The sticky substance would be in contact with the embraced person to keep him securely in place. When scooping up the person needing to be rescued, care needs to be taken that the ends of extensions 15 and 15' do not injure the person. With lower portions 3 and 4 completely separated as apparatus 20 or 20' is lowered, a camera mounted on pivot pin 10 enables helicopter pilot to view the scenery below and position the apparatus directly over the person to be scooped up. Nevertheless, there is always the possibility of ends 29, FIG. 12, making contact with the person's body when coming together. To minimize any possible bruise from contact of optional ends 29, FIG. 12, upon a person's body, ends 29 are thin and flexible with rubbery sleeves 32 covering ends 29 like a glove; yet these ends are structurally strong, bending but not breaking, such as Delrin.

Figure 11:
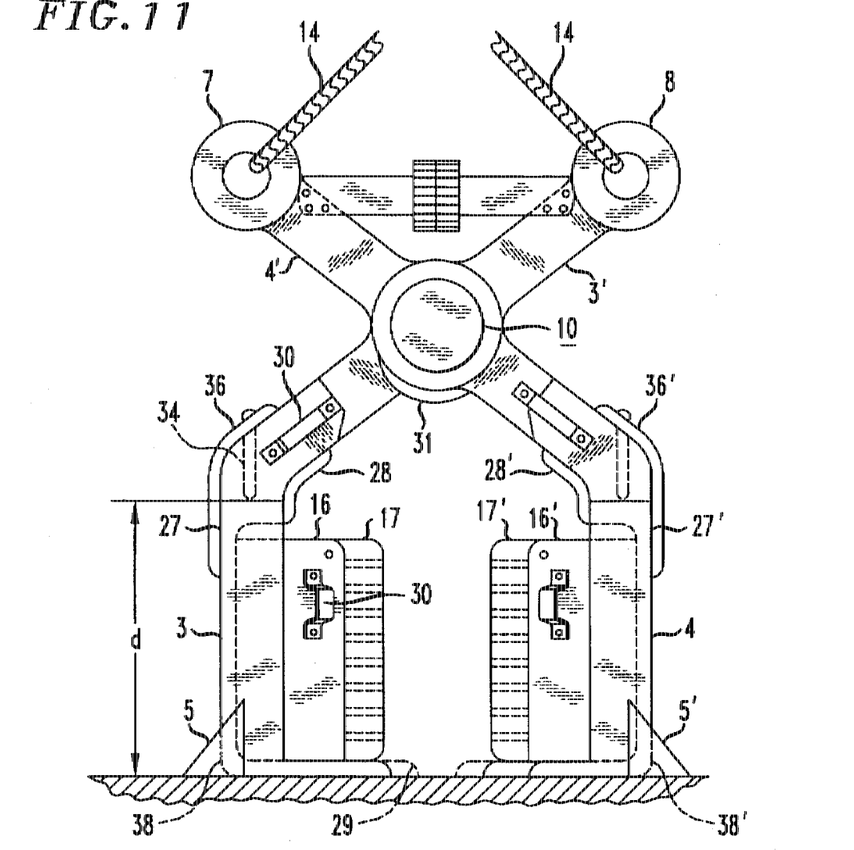
FIG. 11 shows a front view of the improved personnel snatching, scooping apparatus. Air-inflated pillows and attached perforated cushions adjust to the person's size and shape. handles are provided for the person to grasp on to while being hoisted. Also spacers are shown to lengthen the height of its lower portions.
Figure 13:
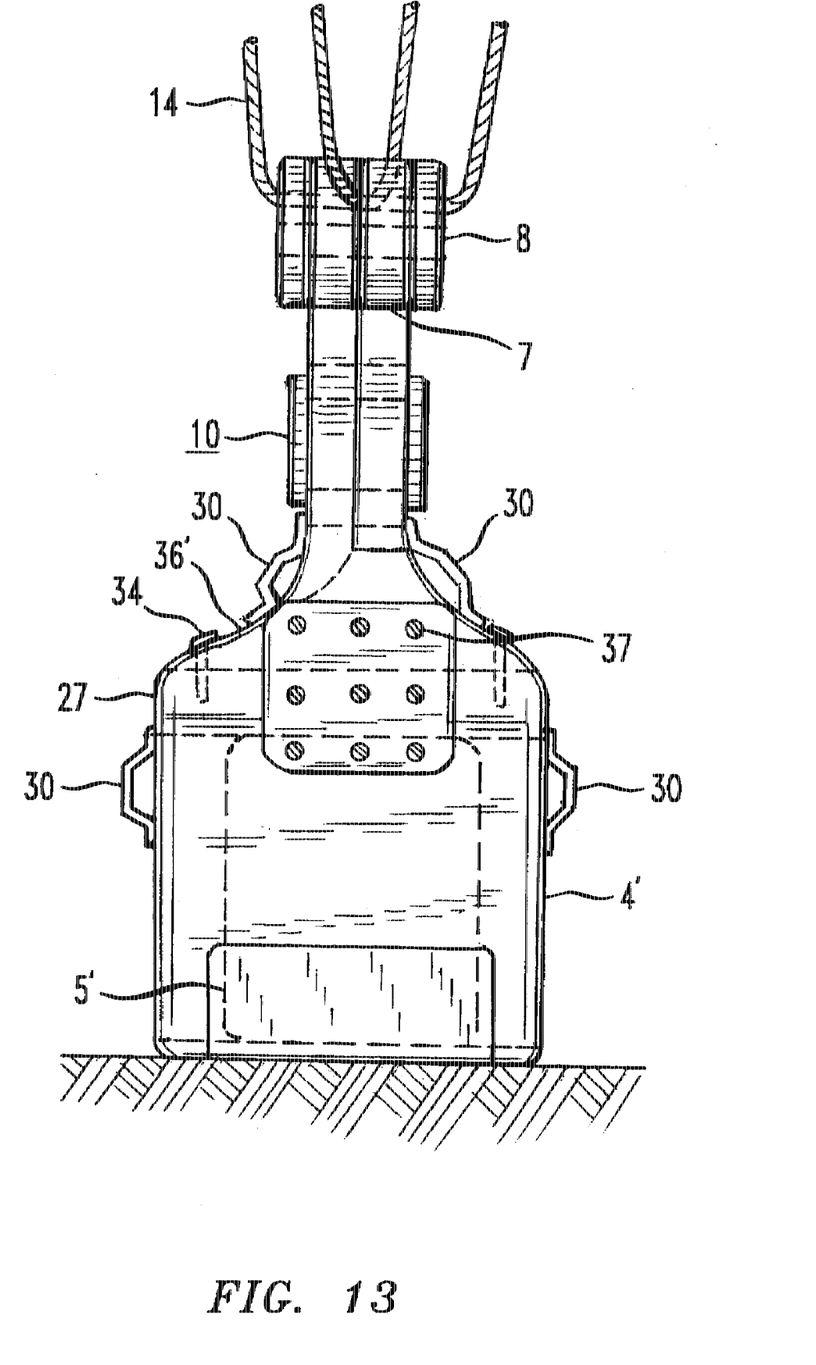
FIG. 13 shows a side view thereof, showing a plate as a brace for strengthening the knee of a lower portion of the apparatus. Handles on each side of the lower portions also are shown.

FIG. 13 is a side view of FIG. 11. Reinforcing brace 36' is fastened to shoulder of lower portions by screws 37. Handles 30 enable an embraced person to hang on to apparatus 20 or 40.

Padding 31 also protects embraced person from injury.

To lengthen distance d, FIG. 11, spacers 27 are added to lower portions 3 and 4 as shown, thus allowing more space and height for person being embraced. Spacers 27 may be fastened to upper portions 33 and 33' and to lower portions 3 and 4 by appropriate size and length screws 34. If the spacer is to remain in place permanently, then spacers 27 and 27' may be welded in place.

Plastic stabilizers 5 and 5', FIGS. 1 and 11, attached to lower sides of lower portions 3' and 4, help apparatus 20 and 20' to stand up erect without falling over. Stabilizers could be fastened to sides 3 and 4 by appropriate glues or by screws.

A stress analysis of apparatus 20 revealed that stresses at knees 11 and 11', FIG. 1, and at 35 and 35', FIG. 1, were the greatest and should be reinforced to avoid their fracture when overstressed. Knees at 11 and 11', FIG. 1, are reinforced with plates shaped to cover curvature of knees and either fastened to knees with screws or welded in place.

Knees 27 and 27', FIG. 11, are reinforced with larger plates 36 and 36', FIGS. 11 and 13, and fastened to knees with stainless steel screws 37. Plates 36 and 36' are sufficiently strong structurally to provide the needed reinforcement. Additional plates 28 and 28', FIG. 11, properly shaped, may be added to the insides of these same knees to further strengthen knees 27 and 27'.

Lower knees 35 and 35', FIG. 1, at bottoms of lower portions 3 and 4 may be thickened at the knee to provide the needed strength to avoid fracture from the weight of the load scooped up by apparatus 20. Similarly, lower knees, 38 and 38', FIG. 11, at bottoms of lower portions 3 and 4, may be thickened at the knee to provide needed strength to avoid fracture from the weight of the load scooped up by apparatus 20.

DESCRIPTION OF STILL ANOTHER PREFERRED EMBODIMENT

In this embodiment of Apparatus 40, extensions 15 and 15' of lower portions have been eliminated. The apparatus with its lower portions spread apart, coming down over person, would be less likely to injure him should one of the portions make contact with a part of his body. Cushion 17 or 17', FIG. 14, would be more likely to come in contact with the person, and being soft, would not cause him any bodily harm. The apparatus being lowered by hoist cables 14 would have its upper and lower portions spread apart by magnetic repulsion; magnets imbedded with hammerheads 1' and 2' having like magnetic polarities causing the repulsion. A solenoid with a pull-type plunger is mounted on horizontal bar 1, as in a previous patent application. When hammerheads 1' and 2' in their repulsion position, plunger is extended into a hole in the rear of hammerhead 1'. Hammerhead 1' is free to rotate. After lower portions 3 and 4 have straddled the person to be scooped up, solenoid is energized and its plunger retracts, allowing hammerhead 1' to automatically rotate 180°, with magnets of opposite polarity facing each other, thus helping upper and lower portions of apparatus 40 to come together, by their attraction. Also, when hoist cables 14 are in tension, by being pulled upward, the horizontal components F of force $F_1$, draw the portions together. Thus, positive-load-retention occurs while the load is being hoisted, mainly because of the attraction of magnets imbedded within hammerheads 1' and 2'.

Figure 14:
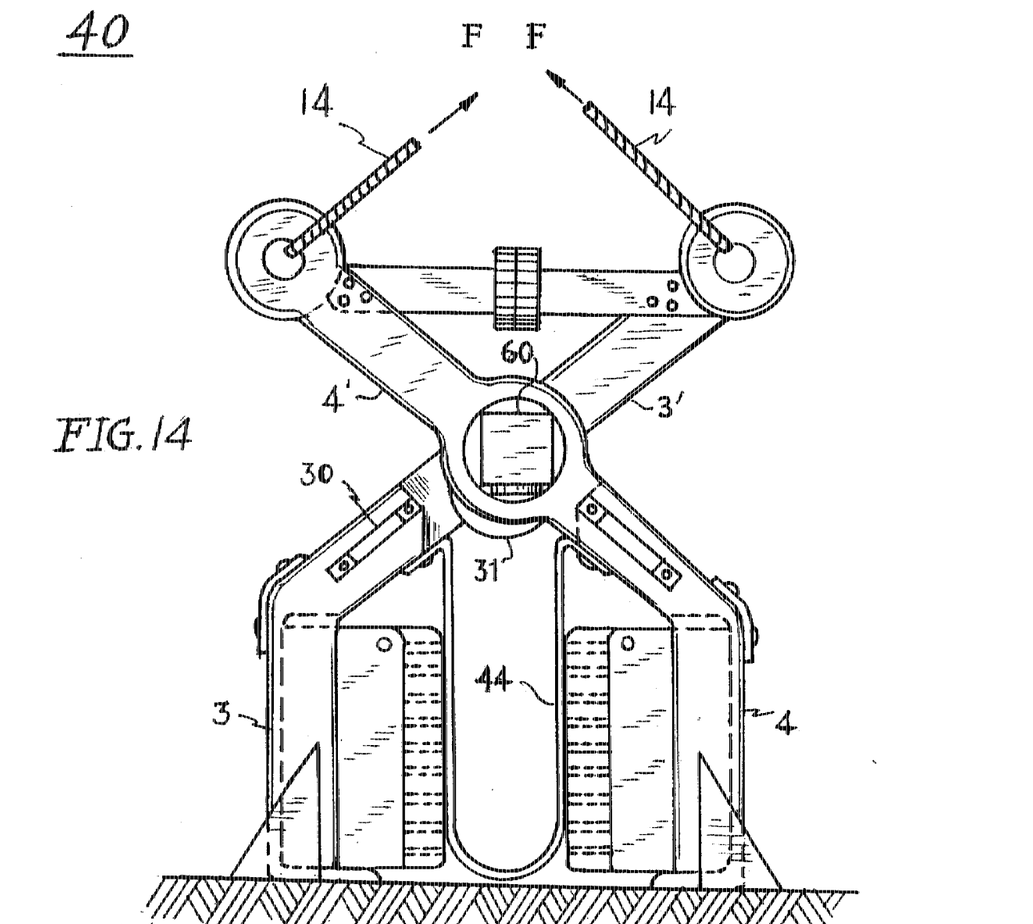
FIG. 14 shows a front view of the improved personnel snatching apparatus with its lower portions closed together and without elongated extensions or protrusions at the bottom of the apparatus for scooping up the load.
Figure 15:
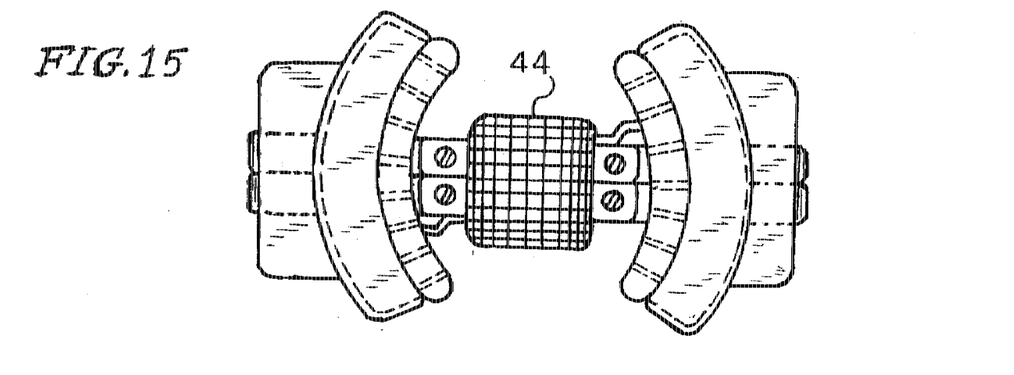
FIG. 15 is a bottom view thereof.
Figure 16:
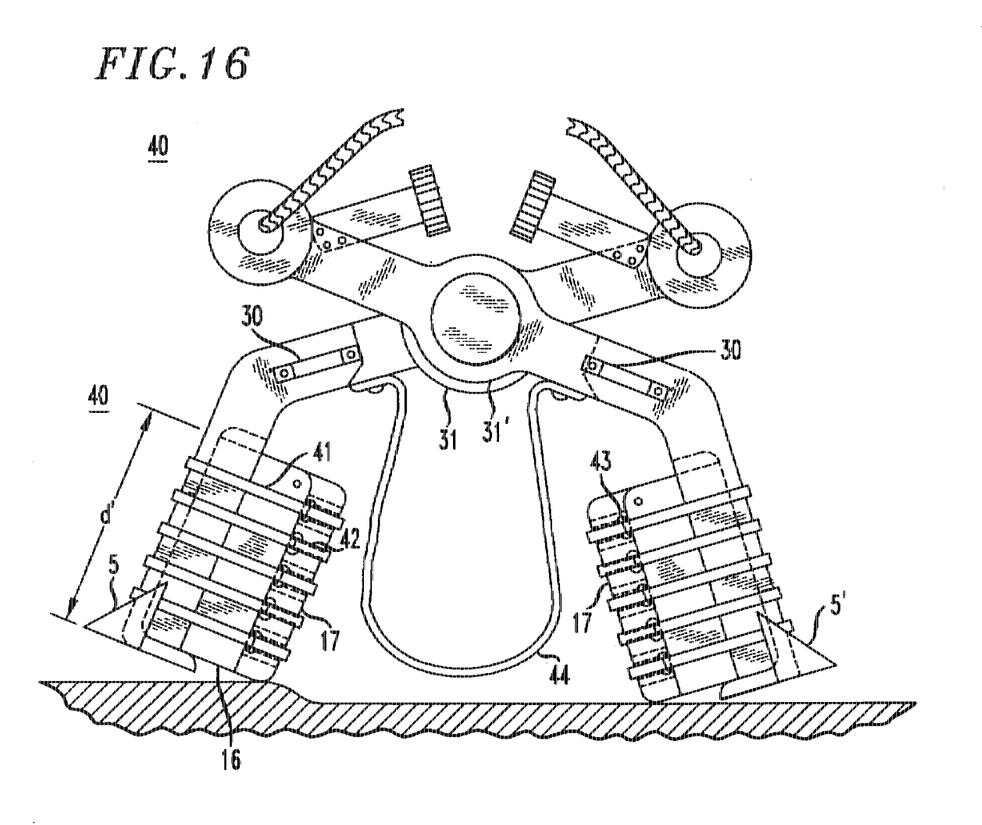
FIG. 16 is a front view of the peronnel snatching apparauts with its lower portions fully separated. Also are shown the elastic bands for the inflatable pillows fastened to the lower portions and nonelastic bands for holding the noninflatable cushions to the surfaces of the pillows. Surfaces of nonelastic bands may be coated with rubber cement.

As in FIGS. 1 and 2, 16 and 16' are inflatable pillows with air valves 18', FIG. 14; 17 and 17' are perforated spongy cushions attached to the inside surface of pillows 16 and 16'. Pillows 16 and 16' may be secured to lower portions 3 and 4 by elastic straps 41. Cushions 17 and 17' could be fastened to pillows 16 and 16' by additional nonelastic straps 42. In addition, rubber cement could be applied to surface of 16 and 17 in contact with each other to keep them together. Similarly, rubber cement could be applied to surfaces 16' and 17' to keep them together. Additional means could be used to assure that pillows 16 and 16' are held onto inside surfaces of lower portions 3 and 4, without producing or causing any leaks in the inflatable material. To avoid confusion in FIGS. 14 and 15, bands 41 and 42 have been omitted, but included in FIG. 16, showing lower portions 3 and 4 separated. Bands 41, FIG. 16, fasten pillows 16 and 16' to lower portions 3 and 4. Bands 41 include loops around each band at its outer surface. These loops enable bands 42 to pass through them so that cushions 17 and 17' could be adhered and fastened to pillows 16 and 16'.

Figure 17:
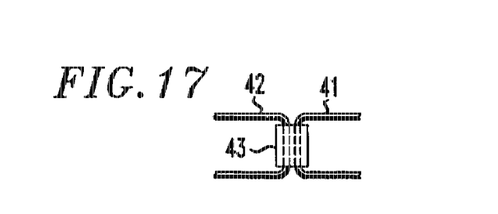
FIG. 17 shows the manner in which the nonelastic bands are linked to the elastic bands, via loops on the elastic bands.
Figure 18:
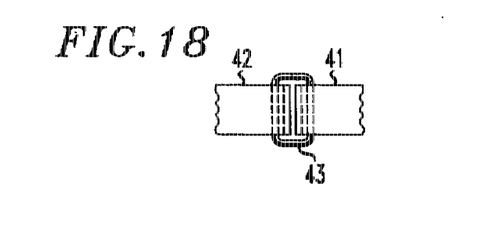
FIG. 18 shows a side view thereof.

The back of each loop would be adhered or fastened to a band 41. Bands come from a spool of strong appropriately wide ribbon or strap. After a ribbon or strap has been wrapped around cushion 17, or 17', the ribbon is cut and its two ends joined together with an appropriate, quick-drying waterproof glue. Bands 42 may be removed by cutting with an appropriate knife or scissor, for replacement of cushion and/or pillow. FIG. 17 is an enlarged partial drawing or view of 41 and 42 being held together by loop 43. FIG. 18 shows a bottom view of FIG. 17. FIG. 18 is the view one sees in FIG. 16 when the person is embraced by cushions 17 and 17'; he grabs hold of handles 30 to assure remaining within the cushions. Also surfaces of cushions 17 and 17' could have a coating of rubber cement to prevent the person from slipping out of the hold of the cushions. Padding 31 is fastened to underneath of hubs 31' to protect a person's body from making contact with a hard surface. Distance d', FIG. 16, may be made greater to allow a person to sit up while being embraced and being hoisted up. To assure a person's secure embracement and his ability to stay safely within the apparatus while being hoisted, net 44, FIGS. 14 and 15, is provided to allow a person to sit upon it. The net is constructed of strong, water-resistant twine to provide the reliable support needed for his weight. When the net is not needed for a particular operation, it could be pushed to one side. The person could still hang on to handles 30 for safe hoisting to the helicopter. He could also grab onto the bands or straps 41 or 42, FIG. 16, in an emergency. Band 41 has elasticity and stretchable. Bands 41 and 42 should be strong enough to hold and keep the person in position within the apparatus, when held on to.

In trying to rescue personnel from a precarious location, there could be the presence of noxious, harmful fumes in the area. The person may be groggy from such fumes. He may require fresh air and oxygen to regain full awareness and full control of his faculties. Oxygen mask 49 and canister or container 45 of pressurized oxygen is available to provide the clean air to enable him to regain full consciousness and full control of his faculties. After crawling into apparatus 20, additional oxygen is available, via additional canisters or containers 45 of pressurized oxygen to keep him revived and in full control until he is hoisted up to the hovering helicopter.

To provide additional oxygen for the patient's well-being, canisters of pressurized oxygen are mounted on shoulders of lower portions of apparatus 20, FIG. 1. One canister 45 is shown on each shoulder of apparatus 20. A flexible tube 47 is connected to each canister, FIG. 1, which then connects to a proportional needle valve 46. From valve 46, tubing 47 is connected to a manifold 48 having as many as five outlets 50, capable of supplying oxygen through existing holes in cushion 26, to provide additional oxygen to the patient.

Figure 19:
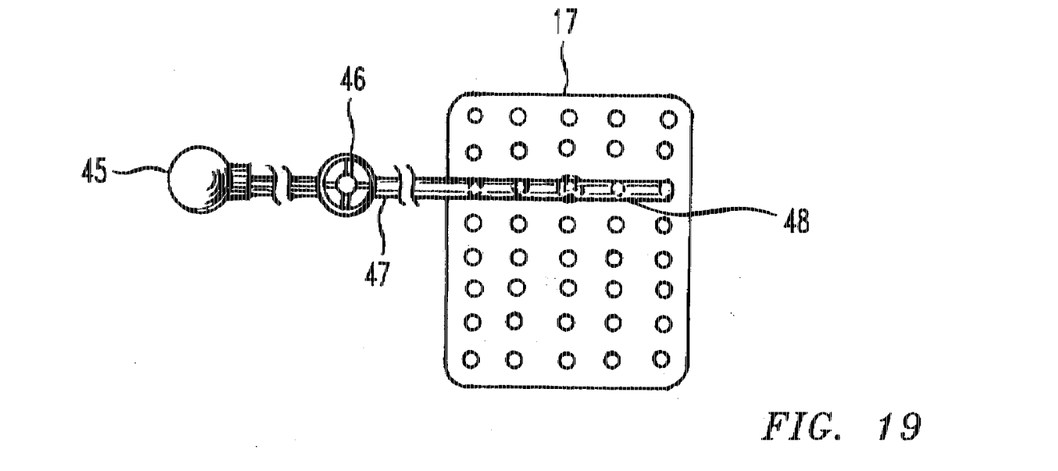
FIG. 19 is a rear plan view of the perforated cushion, a manifold feeding air or oxygen into selected holes of the cushion, a container of pressurized oxygen, a proportional needle valve and interconnecting tubing.
Figure 20:
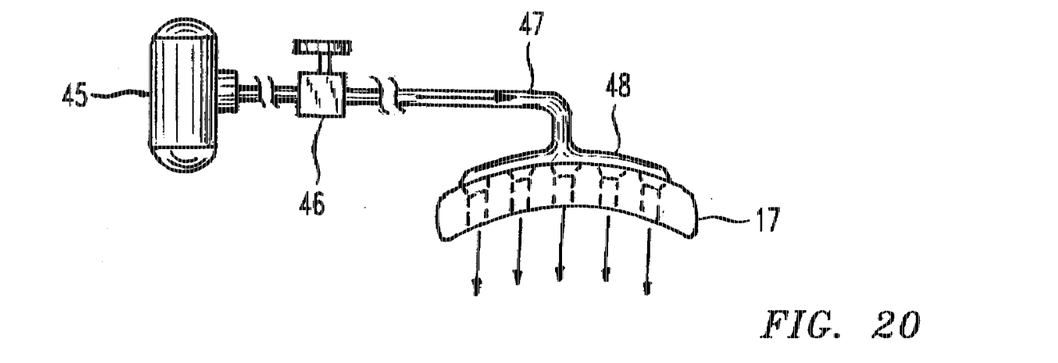
FIG. 20 is a bottom view of the perforated cushion and the manifold shown in FIG. 19.

The amount of oxygen feeding through the outlets of manifold 48 would be controlled ed by the amount that one opens valve 46, FIG. 19. Oxygen could be fed from both canisters, 45, 45', FIG. 1, to provide the needed resuscitation of the patient. All of the above operation could be performed remotely without risking the life of anyone else, to assist the patient physically. The patient is assumed to be able to walk to the apparatus and put on the oxygen mask without assistance from anyone else. A speaker and amplifier could be mounted on pivot pin 10 with the microphone in the aircraft cockpit, so a person aboard the craft could speak to the patient, guiding him to apparatus 20 and providing instructions for properly wearing oxygen mask 49, FIG. 1. Once resuscitated, the patient could crawl inside apparatus 20 and obtain additional oxygen through vents in cushions 17 and 17' or cushions 26, FIGS. 7, 8, When sufficiently recovered, patient could be hoisted up into the hovering helicopter without any physical assistance from anyone on the ground.

To be fully, securely held inside space 51 of apparatus 20, net 44, FIGS. 14 and 15, could be available inside apparatus 20 for the patient to sit upon as he is being hoisted.

Still Another Preferred Embodiment

Figures 21, 24:
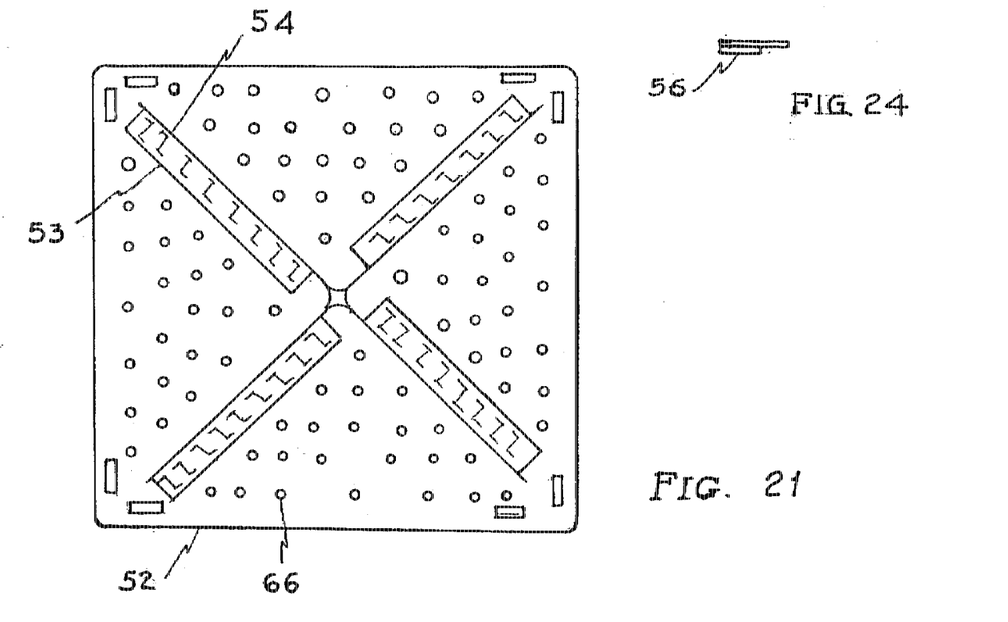
FIG. 21 shows a plan view of a pliable plastic sheet, but having rigidity, with four diagonal cuts and strips of complementary surfaces of a clinging pile adjacent to the cuts.
FIG. 24 shows an end view thereof.
Figure 21A:
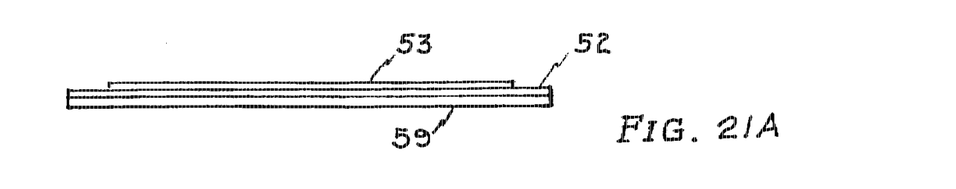
FIG. 21A is an end view thereof.
Figures 22, 23:
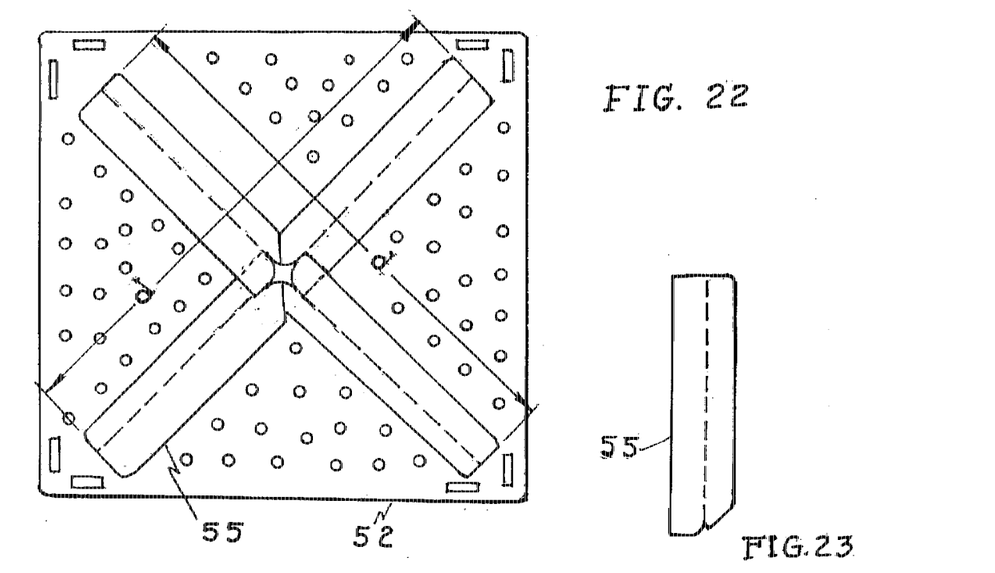
FIG. 22 shows a plan view of the pliable plastic sheet with four diagonal cuts and four velcro strips, each placed over a cut lengthwise, half on one side of the cut and half on the other side of the cut, and adhered only to one side of the cut.
FIG. 23 shows a plan view of the Velcro strip, described in FIG. 22.

In this embodiment the apparatus 40' is identical to 40, except that the net has been replaced by a plastic sheet with pie-shaped cuts in sheet 52. In FIG. 21, there are four cuts shown, but there could be 6 or 8 cuts, making each pie-shaped cut a smaller, more flexible wedge or triangle. An elongated strip 55, FIG. 23, is fastened to each cut along the length of the cut. Velcro, having tiny hooks, is adhered lengthwise across each strip 55, but having half the width of the strip. The Velcro would come in contact with clinging pile 53, FIGS. 21, 22, adhered lengthwise along each cut 54 of sheet 52. Perforations 66 exist in sheet 52.

A person could physically pass through sheet 52 from underneath, but could not pass through from on top the sheet because of the Velcro strips adhering to the clinging pile 52. Thus, after passing through the sheet from underneath, he could sit on the sturdy, flexible sheet safely, while being hoisted up to the helicopter.

As in the previous embodiments, a person could be scooped up by apparatus 40 coming down on top of him; first his head would pass through the pie-shaped cuts, then his body would with lower portions 3, 4, of the apparatus separated as in FIG. 16, when the person has passed through and is safely sitting on sturdy sheet 52, then hoist cable 14 can be pulled upward closing lower portions of apparatus 40, as in FIG. 14. Sheet 52 should be inspected carefully after each use and replaced should stress cracks appear in the sheet or if any of the Velcro or clinging pile has become loosened. It is suggested that more pie-shaped cuts be made in sheet 52 than the four shown to enable a person to pass through sheet 52 more easily.

With the addition of sheet 52, inflatable pillows 16 and 16' and cushions 17 and 17' would still be a part of apparatus 40.

Figure 25:
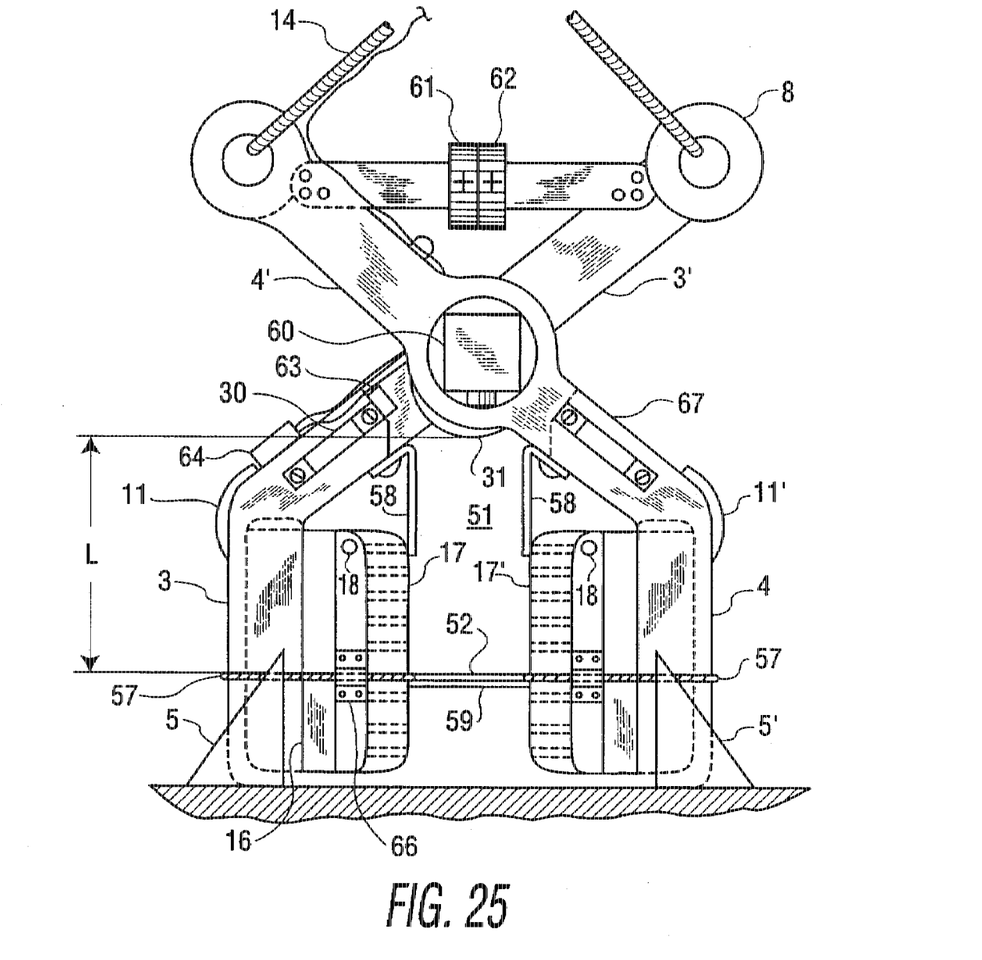
FIG. 25 shows an assembly of apparatus 40' in which the sheet of FIG. 22 is shown in position, with sturdy cords supporting the sheet. The apparatus is shown with its lower portions in a closed position.

FIG. 25 shows sheet 52 in suspended position in space 51 in lower portions of apparatus 40'. A person is shown sitting on top of sheet 52. His arms could be stretched hanging on to a strap 58, similar to a N.Y. subway strap; straps are suspended from shoulders of lower portions 3 and 4. Distance L may be increased to allow more headroom for a person, as in FIG. 11 Sheet 52 is suspended by sturdy cords 57, which would be fastened tightly at their free ends to lower portions 3 and 4. FIG. 25. The above design would enable a person unable to walk to be rescued from a dangerous environment or situation. When the person is seated on flexible sheet 52, the Velcro 56, FIG. 24 along cuts 54, in sheet 52, would prevent the person's weight from causing the pie-shaped cuts from reversing in direction. The pie-shaped cuts can move in only one direction, that is, in an upward direction to allow a person's head and body to pass through the resulting opening in sheet 52. Because of the Velcro strips, a person's body will not move downward, protecting him from falling out of the apparatus.

It should be added that sheet 52 has soft padding 59 underneath so as not to cause any harm to the person whose body is passing through the pie-shaped cuts in sheet 52.

Figure 26:
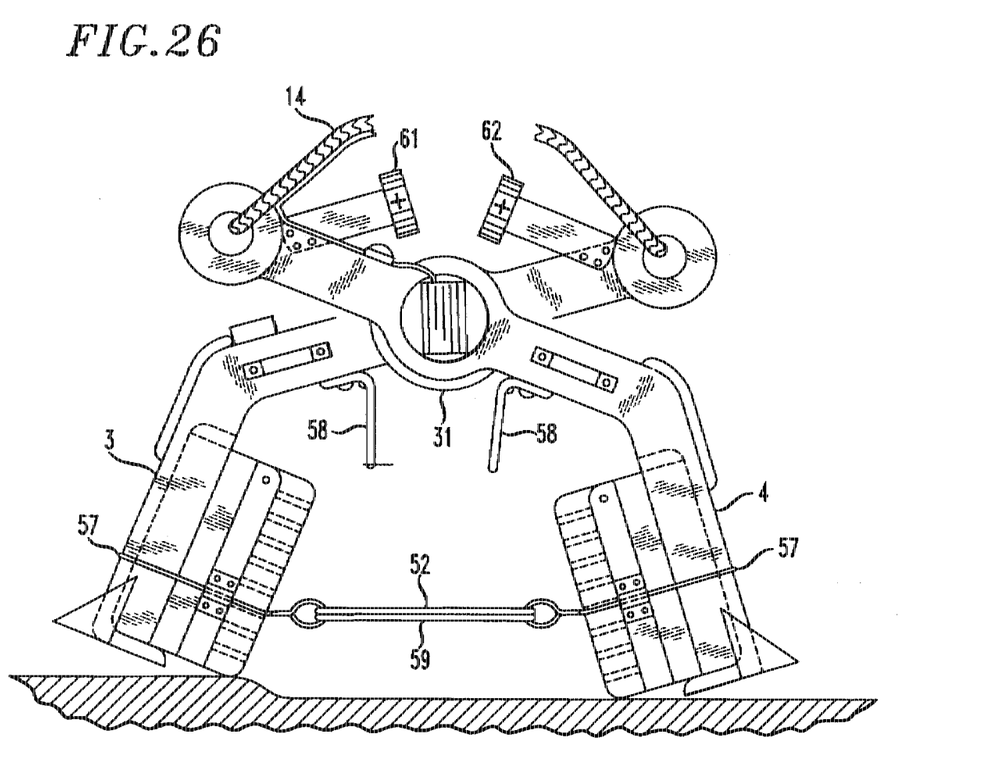
FIG. 26 shows the same apparatus as in FIG. 25 with its lower portions in their maximum separated position. Strap hangers for a person to hang on to are shown as well as handles mounted on thee exterior faces of the shoulders of the apparatus' lower portions.
Figure 27:
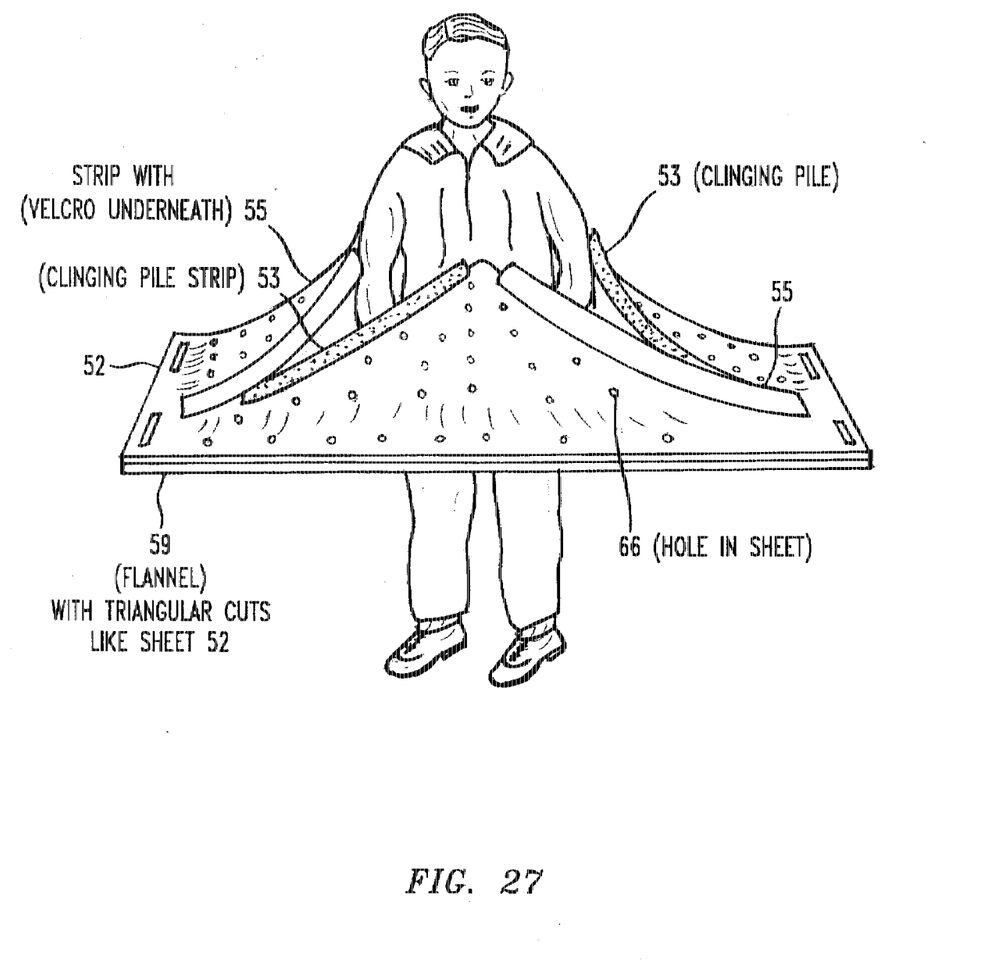
FIG. 27 shows a pictorial view of a child passing through from underneath to the top of the sheet of FIG. 22, to be embraced and held in place by the apparatus' lower portions.

To help position apparatus over the person, surveillance camera 60 FIG. 26 is shown mounted on face of pivot pin with the CRT monitor located in the helicopter cock pit for the pilot and his co-pilot to observe.

The proportional needle valve 46 for admitting oxygen to the individual in the apparatus could be turned on and operated remotely from the aircraft, using a radio receiver to operate the valve and a transmitter in the aircraft send the appropriate signals. This would perform similarly to the remotely-operated toy radio cars, where antennas are used for transmitting and receiving signals. A DC motor runs the toy car. Components of tension in hoist cable 14 keep lower portions 3 and 4 in their closed position. It should be added that appropriate permanent magnets are imbedded in stainless steel casings, not shown, the casing providing structural strength to the hammerhead. The object of having the benefit of the repulsive effect of like magnetic polarities, as described above, is to avoid the addition and complexity of a DC motor to cause lower portions 3 and 4 to separate at touchdown.

To provide added safe embracement for the person being held in place by the apparatus, while being hoisted, rubber cement may be added to the upper interior surfaces of cushions 17 and 17', FIG. 25.

Figure 28:
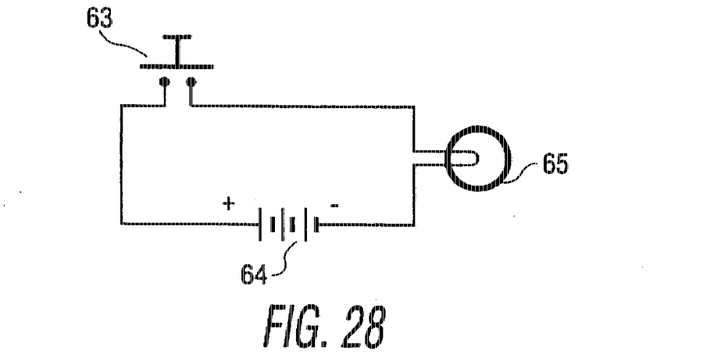
FIG. 28 is a circuit diagram of a lamp, push button switch and battery all connected in series, to indicate when apparatus' lower portions are fully separated.

To indicate to the pilot of the helicopter that lower portions 3 and 4 are fully separated, battery-operated circuit, FIG. 28, is provided.

Push-button, two-point-make switch 63 is mounted in recess portion 12 of lower portion 3 of apparatus 40'. Battery 64, switch 63 and lamp 65 are connected in series, as shown in FIG. 28.

Figure 29:
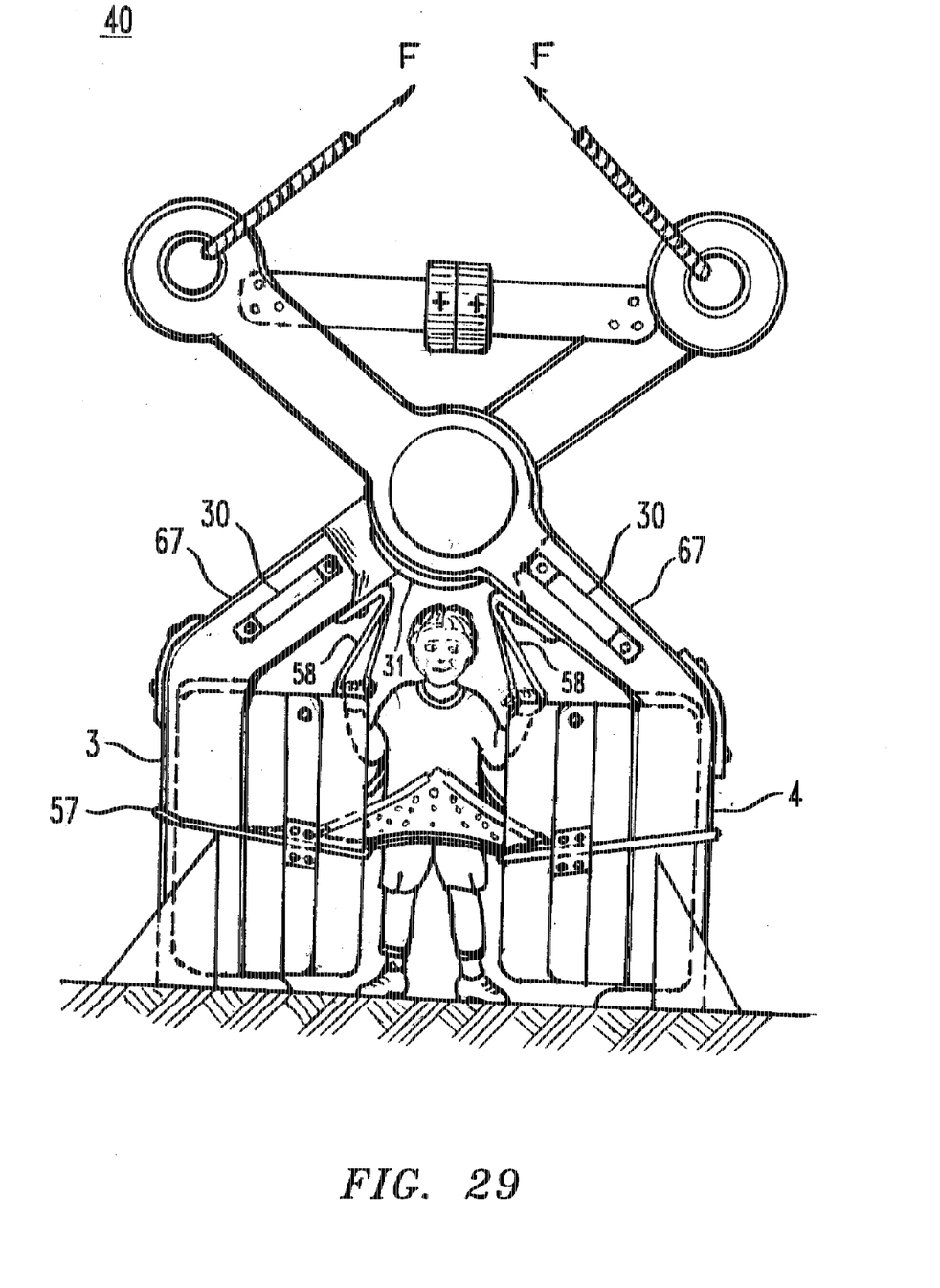
FIG. 29 is an assembly of an apparatus in which a child is embraced with the cooperation of a sheet cut in triangular segments for a person to push through and be vertically supported thereby.

In FIGS. 29 and 25, straps 58 are fastened to surfaces underneath shoulders 67. FIG. 29 is an assembly of apparatus 40' in which a child is embraced with the cooperation of a sheet cut in triangular segments for a person's head to pass through and be vertically supported thereby. The sheet has flexibility.

I claim:

1. An automatically-actuated, remotely-controlled load-lifting apparatus, suspended from a helicopter, with a cockpit, in the hover mode, capable of scooping up, then subsequently unloading various sizes and shapes of lightweight cargo or personnel on a supporting platform, comprising a structure having two elongated lightweight members with lower and upper portions having inside surfaces, said members pivoted with a pivot pin at a selected distance from their top end, with a hub surrounding said pivot pin, said members adapted for use with hoist cables, said hoist cables being adapted for attachment to said upper portions, said upper portions having weights on top and having less width than said lower portions, said lower portions being vertical and curved on their sides for engaging said cargo;

each of said upper portions having a bar inwardly extending from an upper portion's inside surface, each bar having a hammerhead at one end, and each said hammerhead, when abutting, receiving the major structural compressive stresses imposed by the horizontal force components of said cables, when supporting said cargo, thereby said cargo being spared possible damaging compressive forces; said lower portions having extended protrusions with selectively sharp ends, extending a selected distance toward the apparatus' horizontal center, wherein the improvement in said lower portions include two layers of cushions attached to each of said inside surfaces, the first of said layers being inflatable, and the second being spongy and perforated with holes, said holes being in rows and each of said rows of holes being connected with channels to allow a person embraced between the cushions, while undergoing hoisting of apparatus, therein, to breathe, thereby avoiding suffocation.

2. An automatically-actuated weight-lifting apparatus in accordance with claim 1, wherein padding is attached to the underneath of said hub surrounding said pivot pin, to absorb the impact of a person's body coming in contact with said hub, thus avoiding injury to said person's body.

3. An automatically-actuated weight-lifting apparatus in accordance with claim 1, wherein said perforated cushion has cone-shaped peaks and inverted cone-shaped troughs, to enable one to breathe more easily, thus avoiding any possibility of suffocation.

4. An automatically-actuated weight-lifting apparatus in accordance with claim 1, wherein handles are added to said lower portions to enable a person embraced inside said portions to grasp said handles and avoid the possibility of falling off said apparatus, while being hoisted upward to a hovering helicopter.

5. An automatically-actuated weight-lifting apparatus in accordance with claim 1, wherein spacers are added to said lower portions when desirable to increase the height of said lower portions to accommodate a larger person embraced within said lower portions.

6. An automatically-actuated weight-lifting apparatus in accordance with claim 1, wherein lightweight plastic stabilizers are added to the sides of said lower portions, near or at the bottom of said portions.

7. An automatically-actuated apparatus in accordance with claim 1, wherein knees exist near the top of said lower portions, said knees being reenforced with bent plates to avoid said knees from bending from the weight of said scooped-up cargo.

8. An automatically-actuated apparatus in accordance with claim 1, wherein the knees of said extended protrusions at the bottom of said lower portions are reenforced to avoid said knees from bending by the weight of said cargo, said bending possibly jeopardizing the safe secure embracement of said cargo.

9. An automatically-actuated apparatus in accordance with claim 1, wherein a non-drying sticky substance is added to the surfaces of said cushions to help keep an embraced person in place.

10. An automatically-actuated apparatus in accordance with claim 1 wherein said protrusions have ends and wherein soft rubbery plastic covers or sleeves are added to said ends to avoid said ends from injuring said personnel.

11. An automatically-actuated apparatus in accordance with claim 4, wherein said extended protrusions are significantly shortened to avoid their making contact with the body of a person and causing injury; the portion of said protrusion remaining being of a resilient material, said person scooped up also hanging on to said handles.

12. An automatically-actuated apparatus in accordance with claim 1, wherein said pillows are fastened to said lower portions by elastic bands to expand and contract with the inflation pressure in said pillows.

13. An automatically-actuated apparatus in accordance with claim 12, wherein said bands fastening said pillows have loops located at their exterior peripheries for other nonelastic bands to be inserted, said other bands to fasten said cushions to said pillows by passing through said loops on said elastic bands.

14. An automatically-actuated apparatus in accordance with claim 1, wherein said pillows are wrapped around with a structural material to cover their three surfaces and protect said pillows from damage.

15. An automatically-actuated apparatus in accordance with claim 1 wherein said lower portions have shoulders and wherein a net is suspended from underneath the shoulders of said lower portions for said person to sit upon while being hoisted upward to said helicopter, said net being made of strong water-resistant twine to support the weight of said person, under all climatic conditions.

16. An automatically-actuated apparatus in accordance with claim 1, wherein said lower portions have shoulders and wherein containers of pressurized oxygen and an oxygen face mask are included for providing a person in an air-polluted area to receive resuscitating oxygen to energize and recover from inhaling fowl air, said containers being mounted on said shoulders and on the face of said pivot pin, the container mounted on said pivot pin having and a proportional valve connected to a face mask, the remaining containers having also tubing and proportional valves connected to manifolds, each of said manifolds attached to a perforated cushion for said oxygen to be discharged through said holes in said cushions to the person embraced by said apparatus, the quantity of oxygen discharged by a manifold being controlled by the opening of a proportional valve.

17. An automatically-actuated, remotely-controlled load and personnel—lifting apparatus, suspended from a helicopter, with a cock-pit, in the hover mode, capable of scooping up, then subsequently unloading various sizes and shapes of relatively lightweight loads on a rigid support, comprising a structure having two elongated lightweight members with a lower position and an upper portion having inside surfaces; said lightweight members being pivoted with a pivot means at a selected distance from their top ends, said pivot means having a hub surrounding a pivot pin, said lightweight members adapted for use with hoist cables, said hoist being adapted for attachment to said upper portions, said upper portions having weights on top and having less width than said lower portions, said lower portions being vertical and contoured on their sides for engaging said load; each of said upper portions having a bar inwardly extending from an inside surface of the upper portion, each bar having a hammerhead at one end, and each said hammerhead, when abutting, receiving the major structural compressive stress imposed by the horizontal force component of said cable, when supporting said load, thereby said load being spared possible damaging compressive forces, wherein the improvement in said lower portions include an inflatable pillow attached to each of said sides, a spongy cushion with perforations attached to each exposed side of said pillow, said perforations allowing a person embraced therein to breathe; and handles are added to said lower portions to enable a person embraced therein to grasp said handles for avoiding the possibility of falling from said apparatus; and wherein said lower portions that slope to said hub have shoulders, and two straps are suspended in the space underneath said shoulders for said person to hang on to, in addition to said handles.

18. An automatically-actuated apparatus in accordance with claim 17, and wherein a flexible plastic sheet is suspended from the lightweight members and said sheet being padded underneath and having at least four radial elongated cuts forming at least four triangular segments in the center of said sheet, a strip being placed along each elongated cut; half of said strip, along its lengthwise direction, being attached to said sheet and the other half having Velcro, to engage to clinging pile on the top surface of said sheet, when pressed down; thus when said apparatus is allowed to come down on a person, standing or sitting, said sheet would come precisely over said person's head, causing said triangular segments to lift and allow said person's head to pass through, then subsequently his body to pass through; once his body has passed through, the person can sit on top of said sheet and he will not fall through, because said Velcro would adhere to said clinging pile, said person pulling on said straps, providing him with assistance in passing upward through the opening, provided by said triangular segments in said flexible sheet; said sheet further being adapted for preventing said person from falling through said opening even if only half his body passed through.

19. An apparatus in accordance with claim 17 and wherein each said hammerhead extending inward contains a permanent magnet, said magnet's exterior having the same polarity as the polarity of the magnet contained in the opposing hammerhead, so that the two magnets when coming together tend to repel with a force of sufficient intensity to assist in said lower portions separating from each other the moment said hoist cables slacken upon touchdown of said apparatus, said magnets also preventing said hammerheads, when abutting, from sticking together and hindering the separation of said lower portions at touchdown.

* * * * *